Feb. 5, 1952 D. A. BECK ET AL 2,584,961
JET-PROPELLED AIRPLANE WITH JETTISONABLE
WING TIP FUEL TANKS
Filed Sept. 8, 1945
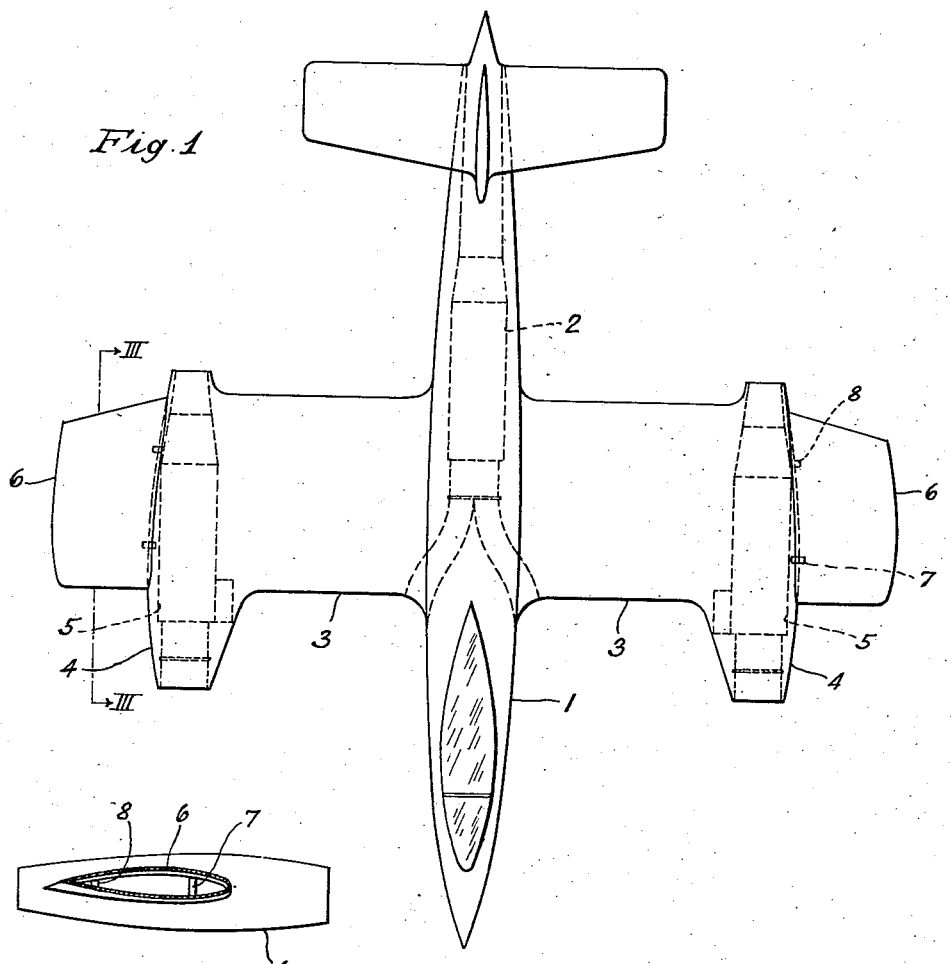
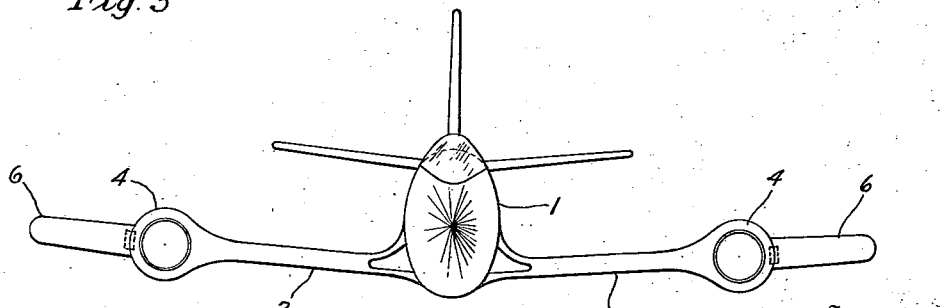
Inventor
Derwood A. Beck
Edwyn A. Eddy
By H. H. Oldham
Attorney Patented Feb. 5, 1952

2,584,961

UNITED STATES PATENT OFFICE 2,584,961

JET-PROPELLED AIRPLANE WITH JETTISONABLE WING-TIP FUEL TANKS

Derwood A. Beck, Seville, and Edwyn A. Eddy, Massillon, Ohio, assignors to Goodyear Aircraft Corporation, Akron, Ohio, a corporation of Delaware Application September 8, 1945, Serial No. 615,126

4 Claims. (Cl. 244—15)

This invention relates to a jet propelled airplane of the three motor military combat type, and, in particular, to the arrangement of the wing power plants.

Heretofore, power plants mounted on the wings always were located between the wing tips and the fuselage, and pertaining fuel tanks, if forming a part of and being contoured to the shape of the wings, were made a permanent portion thereof.

It is the general object of this invention to improve the construction and operativeness of such planes.

Another object of this invention is to reduce the wing width of the plane by placing the wing motors on the tips of the wings which results in endplate effect that cuts down the wing tip vortex.

Another object of this invention is the use of droppable fuel tanks of airfoil shape as wing extensions, attached to the outside of the housing of the wing power plants, or to the wing tips, and which, in flight, carry their own weight, at least, and may be dropped when desired.

The aforesaid objects of the invention, and other objects which will become apparent as the description proceeds, are achieved by disposing the wing motors, usually of the jet type, at the tip of the wings. The placing of the jet units on the wing tips results in endplate effect that cuts down the wing tip vortex. This will increase the effective aspect ratio of the wing. As a result, the fuel economy is improved. In addition, the droppable fuel is carried in airfoil shaped wing tip tanks that are, in effect, droppable wing tanks. By this means, the wing area is increased so that take-off is greatly facilitated. The additional wing area, and the increase in aspect ratio resulting from the use of these tanks, will also improve the cruising efficiency of the design.

For a better understanding of the invention, reference should be had to the accompanying drawings wherein Fig. 1 is a plan view of one embodiment of the invention; Fig. 2 is an elevational front view of Fig. 1; and Fig. 3 is a cross sectional side view taken on line III—III of Fig. 1.

With specific reference to the form of the invention illustrated in the drawing, the numeral I indicates the fuselage of an airplane in which is mounted a jet motor 2 capable of flying the airplane at cruising speed at lower altitudes. Near the bottom of the fuselage are extending supporting wings 3, the tips of which are formed by substantially circular streamlined casings 4 for housing jet motors 5 which both together are capable of flying the airplane at cruising speed at higher altitudes. The motor casings which extend beyond the leading, as well as the trailing edge of the wings are of greater diameter than the wing thickness and act as wing end plates or wing tip vortex reducers which correspond to an increase of the aspect ratio. For facilitating the take-off of the airplane, fuel tanks 6, having a high lift airfoil cross section, or being of greater thickness than the wing cross sections, are attached to the outside of each one of the power plant casings 4 to serve as wing extensions, or auxiliary wing surfaces, to increase the aspect ratio of the airplane. In flight, these fuel tanks, in filled condition, fully carry their own weight, and, therefore, do not throw excessive stresses upon the wings. However, the wing fuel tanks 6 are not permanently fixed to the wings but are made droppable in case of combat, or for other reasons, by means of release attachments 7 and 8 operable at will by the pilot.

Even though it is believed the operation of the airplane will be apparent from the foregoing description, a brief review thereof will now be made for purposes of summary and simplification.

In starting the airplane with all three motors, the droppable airfoil-shaped fuel tanks will assist easy take-off. Once the airplane has attained the necessary speed, the motor in the fuselage will be sufficient for propelling the airplane at lower altitudes. In higher altitudes, the two wing motors will furnish the necessary power and at high altitude, all three motors furnish the driving power at best efficiency. As soon as the airplane goes into combat, the wing fuel tanks may be dropped to decrease the resistance, and to increase the speed. However, when the airplane, in its mission, does not enter into a combat, the empty wing tanks do not need to be dropped resulting in a better fuel economy for the return flight. Time, the possibility of changing the wing area gives the airplane a greater operative advantage over airplanes having a fixed wing area. In order to give the airplane the greatest possible lift at the take-off, the wing fuel tanks receive a high lift cross section, or greater thickness, than the wings proper, which, when dropped, reduce the air resistance at high speed, and then the wing motor casings forming the wing tips act as wing end plates, and are making the wings more efficient by reducing the wing tip vortex.

It will be recognized that the objects of the invention have been achieved by improving the take-off by means of the droppable wing fuel tanks which, when having served their purpose, can be removed to reduce the air resistance of the airplane, whereas, the motor casings, forming then the fixed wing tips, improve the lift of the wings by reducing the wing tip vortex.

Besides, the airplane construction, as illustrated, resulting in the above cited advantages, other locations of the wing motors may be chosen, but still droppable wing tip tanks of airfoil shape may be employed to achieve the principal advantage of an easy take-off and the carrying of a large fuel load for increased operability.

While, in accordance with the patent statutes, one best known embodiment of the invention has been illustrated and described in detail, it is to be particularly understood that the invention is not limited thereto, or thereby, but the inventive scope is defined in the appended claims.

We claim:

1. An airplane comprising, a fuselage, a jet power motor disposed in said fuselage, a pair of supporting wings extending from said fuselage, a housing enclosing a jet power motor and forming the tip of each wing organically connected therewith, a fuel tank of airfoil shaped cross section substantially horizontally extending from each one of said housings and acting as an auxiliary lifting surface for said airplane, and releasable connecting means between said fuel tanks and said wing tips adapted to drop said tanks during flight.

2. An airplane comprising, a fuselage, a jet power motor disposed in said fuselage, a pair of supporting wings extending from said fuselage, a housing enclosing a jet power motor and forming the tip of each wing organically connected therewith, a fuel tank of airfoil shaped cross section extending beyond each one of said housings substantially in the plane of each respective wing and acting as an auxiliary lifting surface for said airplane, and releasable connecting means between said fuel tanks and said wing tips adapted to drop said tanks during flight.

3. An airplane comprising, a fuselage, a jet power motor disposed in said fuselage, a pair of supporting wings extending from said fuselage, a housing enclosing a jet power motor and forming the tip of each wing organically connected therewith, a fuel tank of airfoil-shaped cross section being of greater thickness than that of the supporting wings attached to each one of said housings and acting as auxiliary lifting surface for said airplane, at each side of the airplane, the wing, the power motor housing and the auxiliary lifting surface being disposed substantially in one plane, and releasable connecting means between said tanks and said wing tips adapted to drop said tanks during flight.

4. An airplane comprising, a fuselage, a power motor, disposed in said fuselage, a pair of supporting wings extending from said fuselage, a housing enclosing a power motor and forming the tip of each wing organically connected therewith, a fuel tank of airfoil-shaped high lift cross section attached to each one of said housings and acting as auxiliary lifting surface for said airplane, at each side of the airplane, the wing, the power motor housing and the auxiliary lifting surface being disposed substantially in one plane, and releasable connecting means between said tanks and said wing tips adapted to drop said tanks during flight.

DERWOOD A. BECK.
EDWYN A. EDDY.

REFERENCES CITED

The following references are of record in the file of this patent:

UNITED STATES PATENTS

| Number | Name | Date |
|---|---|---|
| 1,951,817 | Blount | Mar. 20, 1934 |
| 1,996,281 | Dolan | Apr. 2, 1935 |
| 2,024,274 | Campini | Dec. 17, 1935 |
| 2,256,198 | Hahn | Sept. 16, 1941 |
| 2,277,242 | Makaroff | Mar. 24, 1942 |
| 2,375,423 | Lobelle | May 8, 1945 |
| 2,377,247 | Lagelbauer | May 29, 1945 |

FOREIGN PATENTS

| Number | Country | Date |
|---|---|---|
| 427,017 | Great Britain | Jan. 9, 1934 |